Figure 1:
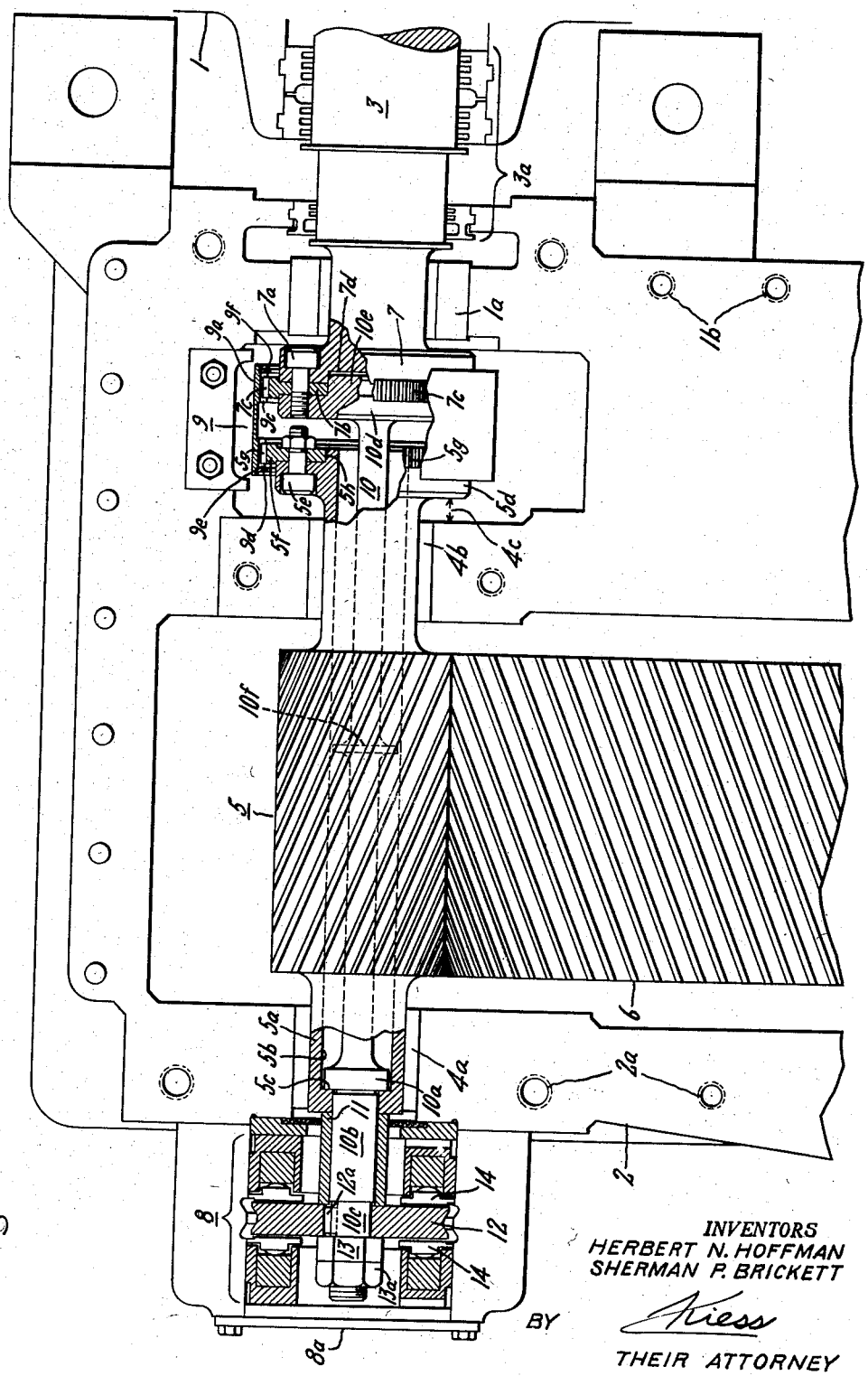

INVENTORS
HERBERT N. HOFFMAN
SHERMAN P. BRICKETT
BY
THEIR ATTORNEY

United States Patent Office 2,867,999
Patented Jan. 13, 1959

2,867,999

CLOSE-COUPLED ROTOR ASSEMBLY WITH THRUST-TRANSMITTING FLEXIBLE COUPLING FOR TURBINE-GEAR UNIT

Herbert N. Hoffman, Lunenburg, Mass., and Sherman P. Brickett, East Derry, N. H., assignors to General Electric Company, a corporation of New York Application December 3, 1957, Serial No. 700,423

6 Claims. (Cl. 64—9)

This invention relates to a flexible coupling and a flexibly coupled rotor assembly for a powerplant driving a suitable load device through a reduction gear, specifically a steam or gas turbine driving a propeller or generator. While not limited thereto, the flexible coupling of the invention is particularly useful in turbine-gear units for marine application where size and weight must be kept to a minimum.

As will be appreciated by those familiar with marine powerplants, space is almost always at a premium, and any unnecessary weight has the direct effect of reducing the pay load of the vessel. Powerplant-gear units are ordinarily manufactured with one frame or casing for the prime mover and a separate housing or frame for the reduction gear. The respective frames will either be suitably secured together, or secured to a common base or foundation unit so as to support the bearings of the prime mover and gears in proper alignment. In a marine plant particularly, there is a likelihood that stresses may be imposed on the prime mover-gear frame assembly tending to introduce slight misalignment of the rotor bearings. Thus, to compensate for misalignment due to slight manufacturing errors, or due to "weaving" of the ship's hull in operation, it becomes important to provide suitable means for flexibly connecting the powerplant and gear rotors. It is desirable that the degree of flexibility in the connection be such that the separately journaled rotors are free to seek their "normal" position in their respective journals, the connecting means imposing no significant constraint tending to make the alignment of one rotor follow that of the other. Thus, any misalignment introduced by differential thermal expansion or stresses imposed on one frame are not transmitted to the rotor of the other component of the assembly.

Accordingly, an object of the invention is to provide an improved flexibly coupled rotor assembly for a turbine-gear combination occupying minimum space and providing a required degree of flexibility, so as to permit each of the rotors to rotate about the axis determined by its bearings without being affected by any misalignment occurring in th other rotor.

A further object is to provide a rotor assembly of the type described permitting the employment of a single thrust bearing disposed in an exterior location where it is readily accessible for servicing and inspection and carried on a small diameter shaft portion which transmits comparatively little torque, whereby the friction losses in the thrust bearing are minimized.

A still further object is to provide an improved thrust bearing and rotor assembly in which the thrust bearing can be inspected and replaced without disturbing either rotor and the journal bearings thereof.

A still further object is to provide a close-coupled rotor assembly in which the axial position of both rotors is determined by a single thrust bearing at the exterior end of the rotor assembly.

Another object is to provide an improved flexible coupling in which axial positioning of the rotors is effected positively by a thrust member having no parts requiring lubrication.

Figure 2:
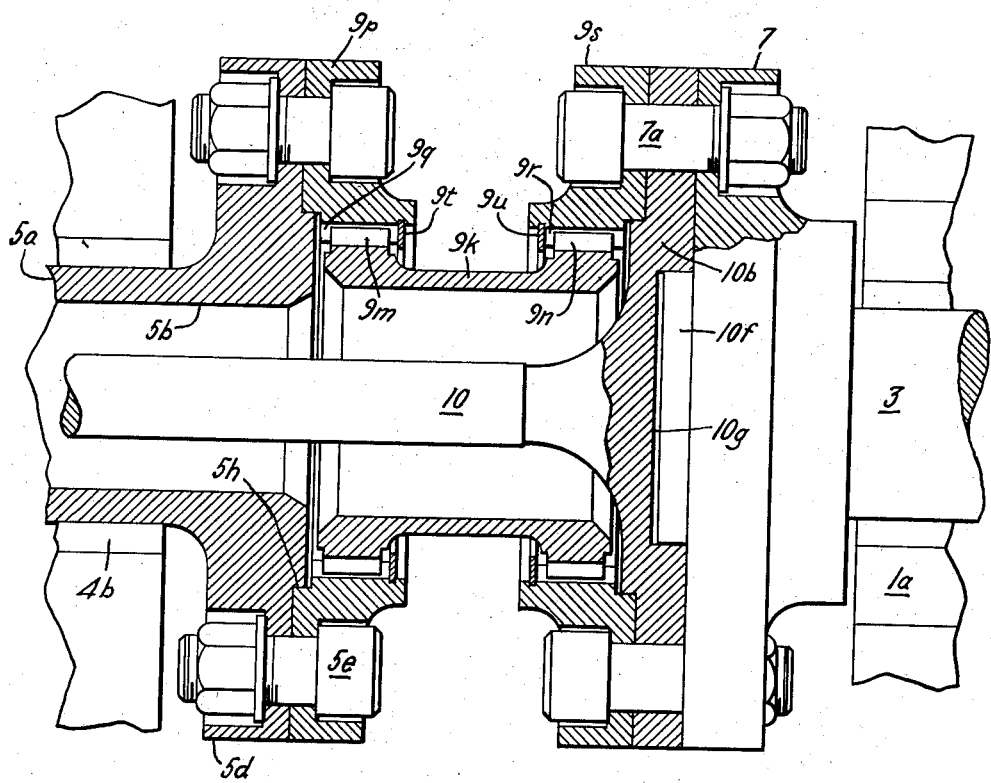

Other objects and advantages will become apparent from the following description, taken in connection with the accompanying drawings in which Fig. 1 is a plan view, partly in section, of a close-coupled turbine-gear rotor assembly with bearings and flexible coupling means arranged in accordance with the invention; and Fig. 2 is a longitudinal detail section of a modified form of the special flexible coupling employed.

Generally stated, the invention is practiced by providing each rotor with its own journal bearings, with a single thrust bearing located at one exterior end of the assembly, the associated rotor having a hollow shaft flexibly coupled to the turbine rotor, the bore of the hollow shaft being occupied by a thrust transmitting strut which is transversely flexible and has end portions rigidly fixed to the respective rotors, without bearing surfaces requiring lubrication. Thus, the rotors are connected by two laterally flexible members, one being a thrust-transmitting member, the other a torque-transmitting member.

Referring now more particularly to the drawings, the invention is illustrated in Fig. 1 as applied to a turbine-gear unit comprising a turbine casing a portion of which is indicated generally at 1, a reduction gearing housing indicated generally at 2, these casings being supported in proper alignment by being secured to a common frame or foundation member (not shown). The turbine rotor shaft 3 is provided with suitable journal bearing means, only one of which is shown at 1a. The reduction gear housing 2 is provided with axially spaced journal bearings 4a, 4b. It will be understood that the bearing 1a (and the other turbine rotor bearings, not shown) determine the desired axis of rotation for the turbine rotor 3, and the independent bearings 4a, 4b define the desired axis of rotation for the gear pinion rotor 5. It is of course desired, from the standpoint of optimum operation of the reduction gear and of the turbine, that the reduction gear pinion 5 should rotate about the axis defined by the bearings 4a, 4b, and that the turbine rotor 3 should rotate about the axis defined by its bearing system, represented by the single bearing 1a, the connecting means between the rotors having no tendency to move them from these desired independent axes of rotation. Thus the flexibility in the connecting means must be such that any misalignment produced by differential thermal expansion in the turbine or by loads imposed on the reduction gears should not result in forces tending to displace the respective rotors from these desired axes of rotation.

It will, of course, be understood that the helical pinion 5 meshes with a gear 6 which is in turn supported in suitable bearings (not shown) and is connected to drive a marine propeller, or a generator or other suitable load device. Such details are not important to the present invention, and the description here will concentrate on the rotor, bearing, and special flexible coupling assembly for the connected rotors 3, 5.

As shown in the drawing, the turbine rotor shaft 3 projects from the turbine casing 1, through a shaft seal 3a and bearing 1a and is provided with an end flange portion 7.

An important feature of the embodiment of the invention illustrated in Fig. 1 is that both rotors 3, 5 are positioned axially in their journal bearings by a single thrust bearing assembly, indicated generally at 8. It will be seen that this thrust bearing is at the extreme exterior end of the rotor assembly, where it is most accessible for inspection, servicing, and replacement of parts. As will be seen more particularly hereinafter, the thrust bearing is thus located on a shaft portion which transmits only a small amount of torque, namely that corresponding to the friction losses in the thrust bearing. Accordingly, this shaft portion can be made of minimum diameter, with the result that the thrust bearing 8 and the rubbing surfaces therein are also of small diameter, so that the rubbing velocities and resulting friction losses are minimized. While any suitable type of thrust bearing may be employed, that shown in the drawings is of the well-known pivoted shoe or "Kingsbury" type, the details of which are well understood by those acquainted with the bearing art and need not be described further here.

Torque is transmitted from the turbine shaft 3 to the gear rotor 5 by a special flexible coupling assembly, indicated generally at 9 and comprising a cylindrical coupling sleeve member 9a with internal spline teeth 9c, 9d.

The axial position of the turbine shaft 3 is determined from the thrust bearing 8 by a rigid connection in the form of a transversely flexible thrust link or strut 10.

The structural details of this special flexible coupling and thrust link will be seen from the following.

As noted above, the hollow gear rotor 5 has a central longitudinal bore 5b extending substantially the length of the rotor and terminating at a location closely adjacent the thrust bearing 8. The function of this bore is to house the thrust-transmitting strut 10.

The left-hand end of thrust strut 10 defines a radially extending shoulder portion 10a which abuts an annular shoulder 5c forming the end wall portion of bore 5b. An axial extension of the thrust link 10 is shown at 10b supporting a cylindrical spacer member 11. The rotating thrust disk or runner 12 is supported on a further axial extension of the thrust strut, identified 10c, being appropriately secured thereto by suitable key members, one of which is identified 12a. The thrust runner 12 is secured on the shaft portion 10c by a nut 13 and a suitable lock nut 13a. As will be apparent in the drawing, the respective side surfaces of the thrust runner disk 12 are engaged by the respective pivoted shoe members 14, the details of which need not be described further. For the purpose of this invention, it need only be noted that the thrust runner 12 absorbs all net thrust loads imposed on the rotor assembly, both those arising in the turbine and those from the gear unit. It will be noted that the pinion 5 is shown as being of a "single helix" type, and the angle of the helix is in such a direction that the thrust produced by the reaction between the gears 5, 6 is in an axial direction opposite to the net thrust imposed on turbine shaft 3, by the aerodynamic forces of the steam flowing through the turbine and by any unbalanced pressure forces exerted on the turbine bucket-wheels (not shown). Thus the thrust bearing 8 needs to be of a capacity only large enough to carry the net difference between the thrust loads arising on the respective rotors.

The construction of the torque transmitting coupling 9 is as follows.

The right-hand end of pinion rotor 5 is provided with an integral flanged portion 5d, to which is secured by a ring of bolts 5e an annular member 5f on which are cut external spline teeth 5g. Ring 5f is centered accurately relative to the flange 5d by an annular shoulder 5h. Similarly, the flanged turbine shaft portion 7 has secured thereto by cap screws 7a an annular member 7b having spline teeth 7c. As will be apparent in the drawing, the external spline teeth 5g, 7c engage the internal teeth of the sleeve 9a. To maintain the sleeve properly located on the toothed rings 5f, 7b, a pair of snap rings 9e, 9f engage suitable annular recesses at either end of the coupling sleeve 9a.

As will be apparent from the drawing, removing the snap ring 9e (with the rotor assembly removed from the bearings) permits the coupling sleeve 9a to slide to the right a distance adequate to expose the external toothed ring 5f. Conversely, removing the snap ring 9f permits the sleeve 9a to be moved to the left a distance adequate to expose the other splined ring 7b. Thus it is simple to expose the teeth of the splined coupling rings, to examine them for wear. The threaded fastenings 7a also serve to secure to the turbine shaft end flange 7 a flange 10d secured to or formed integral with the extreme end of the thrust-transmitting strut 10. Concentricity of flange 10d relative to flange 7 is assured by an interfitting rabbet portion 10e, which engages a cylindrical recess 7d in the turbine shaft flange 7. It will be observed that the spline ring 7b is also maintained concentric with flange 7 by its engagement with the rabbet portion 10e of flange 10d.

It will be apparent that the right-hand end of the thrust strut 10 is firmly and rigidly fixed to the adjacent end flange 7 of the turbine rotor. It now becomes significant to note that the strut 10 is of comparatively small diameter, so as to be sufficiently strong in tension and compression to absorb the thrust loads imposed thereon, without buckling, while remaining quite flexible in a transverse direction so that any slight deviation of the axis of either rotor from exact coaxial relation with the other rotor will not result in substantial transverse forces tending to displace the other rotor in a radial direction in its bearings.

It will be seen that the thrust strut 10 has no moving parts which require lubrication. The left-hand end is rigidly fixed to the adjacent cooperating portions of shaft 5a, spacer 11, thrust runner 12, etc., while the right-hand end is rigidly bolted to the turbine shaft end flange 7. Thus any misalignment between the true axes of the turbine shaft and pinion shaft are taken up by transverse flexing of the thrust strut 10. In order to maintain the strut generally coaxial with the bore 5b, the mid-portion of the strut may be provided with a radial flange portion 10f, the periphery of which either fits snugly or forms a very small clearance space with the bore 5b. This prevents excessive lateral deflection of the mid-portion of the thrust strut. It will be apparent that if the thrust strut 10 were shorter, the radial flange 10f might be dispensed with; and, conversely, if the strut were longer it might be necessary to have two or more of these flange portions to prevent excessive lateral deflection.

The lubrication system for the journal bearings 1a, 4a, 4b and the thrust bearing 8 may be purely conventional and need not be noted here. The flexible coupling spline teeth 9d, 9c, 5g, 7c will be lubricated in a conventional manner, as by a nozzle (not shown) directing a stream of oil into the annular chamber defined by the coupling sleeve 9a with the snap rings 9e, 9f serving as dams to determine the radial thickness of the body of oil contained therein. Thus all elements requiring lubrication are readily accessible and served by conventional lubricating arrangements. On the other hand, the flexible thrust strut 10 has no elements with rubbing surfaces which would require lubrication. Thus the arrangement eliminates the so-called "fretting corrosion" which has been experienced when relatively rubbing portions of a flexible coupling "work" against each other for many millions of cycles, the amount of relative displacement being insufficient to introduce a film of oil. This is an important advantage of this special coupling assembly.

Certain other advantages of this flexibly-coupled rotor assembly will become apparent from the following outline of the method of assembly and disassembly.

Fig. 1 of the drawings actually represents a top view of the assembly with the upper half of the turbine casing and gear housing removed. The respective halves of these casings are secured together by a plurality of threaded fastenings (not shown) disposed through the holes 1b, 2a, etc. With the top casing halves thus removed, the screws 7a become accessible, by turning the rotor assembly so as to bring these threaded fastenings into view. As noted above, removing the snap ring 9f permits the coupling sleeve 9a to be moved axially to the left so as to disengage from the spline ring 7c. The cover plate 8a of thrust bearing 8 and the pivoted thrust shoe assembly 14 are now removed, and the rotor 5 is moved axially to the left slightly, so that rabbet 10e disengages from recess 7d. The clearance space identified 4c is of course made large enough to permit adequate axial movement, for this purpose. Now, either the gear rotor 5 or the turbine rotor 3 may be lifted vertically from its bearings.

Thus it will be apparent that the arrangement permits ready removal of either the turbine rotor 3 or the gear pinion rotor 5 without disturbing the other rotor. It is also significant that the thrust bearing 8 is located in an exposed position where it can be readily disassembled for inspection or servicing, without disturbing either rotor 5 or rotor 3. Thus the thrust bearing 8 may be serviced with a minimum of time and trouble, since the alignment of the rotors in the journal bearings need not be disturbed.

The flexible coupling may take alternate forms, one of which is shown in Fig. 2. Here, like structural elements are identified with similar reference numerals, as in Fig. 1.

It will be seen that in Fig. 2 the coupling sleeve member 9k is of smaller diameter and has external spline teeth 9m, 9n. The left-hand teeth 9m engage internal spline teeth 9q formed on a separate annular member 9p. Ring 9p is secured to the flange 5d by bolts 5e in a manner which will be obvious. Similarly, the right-hand coupling spline teeth 9n engage internal teeth 9r of a ring 9s secured by bolts 7a to the turbine shaft flange 7. The end flange 10b of the thrust transmitting strut 10 is bolted between the flange 7 and ring 9s. Concentricity between these flanges is insured by a cylindrical boss portion 10f projecting from shaft flange 7 and fitting a circumferential rabbet 10g formed in flange 10b. A pair of internal snap rings 9t, 9u engage grooves in the respective splined ring members 9p, 9s serving to retain the coupling sleeve 9k centered, and forming an oil dam as described above in connection with Fig. 1.

It will be readily apparent that the construction of Fig. 2 is generally equivalent to that of Fig. 1, and the method of operation is quite similar. Removing the row of bolts 7a permits ring 9s to move to the left on the coupling sleeve 9k so as to expose the coupling sleeve teeth 9n. Likewise, removing bolts 5e permits moving ring 9p to the right to expose the external coupling sleeve teeth 9m. The method of assembly and disassembly for servicing will be obvious from the drawing.

It will be seen that the invention provides an improved rotor, flexible coupling, and thrust bearing arrangement in which the torque-transmitting function is separated from the axial thrust-transmitting function, the former being performed by a conventional spline tooth type of flexible coupling while thrust is taken by a novel thrust strut having no elements requiring lubrication. The invention effects a close-coupled rotor assembly which minimizes space and weight, makes possible a thrust bearing arrangement which greatly facilitates servicing of the thrust bearing and reduces friction losses therein, while the special torque and thrust transmitting arrangement permits each rotor to rotate about the proper axis defined by the respective journal bearings, irrespective of slight misalignment introduced by differential thermal expansions or forces applied to the respective casings in operation.

While only one form of the invention has been described specifically, it will be apparent to those skilled in the mechanical arts that numerous changes and substitutions of mechanical equivalents might be made. For instance, ball or roller anti-friction type bearings could be substituted for the journal bearings and thrust bearings shown in the drawings. If there were little or no axial thrust imposed by the turbine shaft 3, the single helix gears 5, 6 might be replaced by a double helix or "herringbone" gear. However, the invention is peculiarly advantageous where it is desired to balance the gear thrust against the turbine rotor thrust so that the thrust bearing needs to support only the net difference. If the degree of anticipated misalignment were sufficiently small, the small diameter flexible portion of the thrust strut 10 could be shorter. For instance, the portion 10b of the strut 10 could be extended all the way to the mid-portion represented by the flange 10f. It will also be obvious that the spline teeth 5g, 7c could be cut directly in the periphery of the flange portions 5d, and 7, eliminating the separate splined ring members 5f, 7b. From the standpoint of manufacturing convenience, it appears preferable to cut these spline teeth on the separate ring members and bolt them to the respective end flanges as described herein. This permits inexpensive and easy replacement of the spline members in the event of excessive wear or breakage.

Other modifications and substitutions will be apparent, and it is desired to cover by the appended claims all such modifications as fall within the true spirit and scope of the invention.

What we claim as new and desire to secure by Letters Patent of the United States is:

1. A close-coupled rotor assembly comprising a first rotor having a first end flange portion adjacent and substantially coaxial with an end of a second rotor, bearing means located near the adjacent ends and rotatably journaling said rotors independently, thrust bearing means engaging a portion of the second rotor remote from the first rotor, the second rotor having a longitudinal bore opening adjacent the first rotor end flange and extending to a point adjacent the thrust bearing means, the second rotor having a second end flange portion at the end thereof remote from the thrust bearing means and adjacent the first rotor end flange portion, said first and second rotor end flange portions having annular members defining spline teeth, a coupling sleeve member with end portions disposed substantially coaxial with and adjacent said first and second end flange portions and having spline teeth engaging the flange spline teeth for transmitting torque between rotors, and a transversely flexible thrust-transmitting strut member disposed within said bore and having one end rigidly secured to the end of the second rotor adjacent the thrust bearing means and a second end portion projecting through the coupling sleeve member and rigidly secured to the first rotor end flange portion.

2. A close-coupled rotor assembly comprising a first rotor having a first end flange portion adjacent a second substantially axially aligned rotor, bearing means located near the adjacent ends thereof and rotatably journaling each of said rotors, the second rotor having a second end flange portion adjacent said first rotor end flange portion and an axially extending bore opening through said second end portion, the first and second rotor end flange portions having annular members defining spline teeth, a coupling sleeve member disposed coaxially between said shaft end portions and having end portions disposed adjacent said end flange portions with spline teeth engaging the teeth of said rotor end flange portions for transmitting torque between rotors, said coupling sleeve member being axially slidable within predetermined limits, and a transversely flexible thrust-transmitting strut member spaced within said bore of the second rotor and having one end portion rigidly fixed to the second rotor and a second end portion projecting through said coupling sleeve member and secured rigidly to the first rotor end flange portion, whereby said strut member positions the first and second rotors in desired axially spaced relation to constitute the sole means of thrust transmission between said first and second rotor, while slight misalignment between the axes of the rotors results in transverse flexing of the strut member.

3. A close-coupled rotor assembly in accordance with claim 2, in which the connection between the thrust-transmitting strut and the adjacent first rotor end portion comprises a radially extending flange end portion on the end of the flexible thrust strut and having a centrally axially extending cylindrical boss portion engaging a cylindrical recess in the adjacent end of the first rotor end flange, the annular row of spline teeth being formed on an annular member having an inner diameter centered on said axially extending boss portion, and a plurality of threaded fastenings securing the first rotor end flange to the thrust strut end flange with said annular spline toothed member disposed therebetween.

4. A close-coupled rotor assembly in accordance with claim 2, in which the adjacent rotor end flange members have internal spline teeth, and the coupling sleeve member has external spline teeth at either end thereof engaging said internal teeth.

5. A close-coupled rotor assembly in accordance with claim 2, in which the spline teeth of the respective rotor flange end portions are formed on separate annular members secured to the rotor end flanges, and the connection between the thrust transmitting strut and the adjacent first rotor end portion comprises a radially extending flange portion on the end of the flexible thrust strut and having a central cylindrical recess engaging a cylindrical boss portion projecting from the adjacent end of the first rotor flange portion, the outer circumferential portion of said thrust strut flange being disposed between the periphery of the first rotor end flange and the associated annular spline-toothed member, and a plurality of threaded fastenings securing said last-mentioned annular toothed member to the first rotor end flange with the peripheral portion of the thrust strut flange disposed therebetween.

6. A coupling assembly for connecting substantially aligned axially spaced first and second shaft end portions, comprising journal bearing means supporting said respective shaft end portions in substantially coaxial relation, a first annular member connected to the first shaft end portion and having a circumferential row of internal spline teeth disposed adjacent the first shaft end portion, a second annular member connected to the second shaft end portion and having a second circumferential row of internal spline teeth adjacent the second shaft end portion, a cylindrical coupling sleeve member disposed coaxially within the first and second annular members and having external spline teeth engaging the internal spline teeth of the first and second annular members respectively, and a transversely flexible strut member disposed centrally within and radially spaced from the coupling sleeve member, said strut member having a first end portion connected rigidly to the first shaft and a second end portion connected rigidly to the second shaft, whereby the strut member maintains the end portions in desired axially spaced relation while transverse flexing of the strut accommodates misalignment between the shaft end portions.

References Cited in the file of this patent

UNITED STATES PATENTS

| | | |
|---|---|---|
| 2,550,580 | McLeod et al. | Apr. 24, 1951 |
| 2,655,014 | Walker | Oct. 13, 1953 |
| 2,778,565 | Atkinson | Jan. 22, 1957 |
| 2,809,503 | Gaubatz et al. | Oct. 15, 1957 |

UNITED STATES PATENT OFFICE
CERTIFICATE OF CORRECTION

Patent No. 2,867,999                                    January 13, 1959

Herbert N. Hoffman et al.

It is hereby certified that error appears in the printed specification of the above numbered patent requiring correction and that the said Letters Patent should read as corrected below.

Column 8, line 19, for "the end portions" read -- the shaft end portions --.

Signed and sealed this 14th day of April 1959.

(SEAL)
Attest:

KARL H. AXLINE
Attesting Officer

ROBERT C. WATSON
Commissioner of Patents